US006459367B1

(12) United States Patent
Green et al.

(10) Patent No.: US 6,459,367 B1
(45) Date of Patent: Oct. 1, 2002

(54) AUTOMATED VEHICLE REGULATION COMPLIANCE ENFORCING SYSTEM

(76) Inventors: Randall D. Green, 1115 Eleanor Ave., Rohnert Park, CA (US) 94928; Barbara J. Turpel, 2370 Baggett Dr., Santa Rosa, CA (US) 95401; David L. Turpel, 2370 Baggett Dr., Santa Rosa, CA (US) 95401; Gary J. Lukas, 1460 Chardonnay Ct., Ukiah, CA (US) 95482

( * ) Notice: Subject to any disclaimer, the term of this patent is extended or adjusted under 35 U.S.C. 154(b) by 0 days.

(21) Appl. No.: 09/679,495

(22) Filed: Oct. 4, 2000

Related U.S. Application Data

(60) Provisional application No. 60/157,638, filed on Oct. 4, 1999.

(51) Int. Cl.[7] .................................................. B60Q 1/00

(52) U.S. Cl. ....................... 340/440; 340/928; 340/936; 340/438; 340/439; 701/29; 701/30; 177/1; 177/136; 177/50

(58) Field of Search ................................ 340/440, 928, 340/936, 438, 439; 701/29, 30; 177/1, 136, 50

(56) References Cited

U.S. PATENT DOCUMENTS 2,452,344 A 10/1948 Addorisio
3,597,730 A 8/1971 McClellan, Sr. et al.
3,691,525 A 9/1972 McClellan, Sr. et al.
4,728,922 A * 3/1988 Chritine et al. ........... 340/52 R
4,839,835 A * 6/1989 Hagenbuch ................. 364/567
5,347,274 A * 9/1994 Hassett ....................... 340/988
5,410,109 A * 4/1995 Tarter et al. ................ 177/136
5,583,765 A * 12/1996 Kleehammer ........ 364/423.098
5,610,372 A * 3/1997 Phillips et al. ........... 177/25.14
5,877,454 A * 3/1999 Uehara et al. ................. 177/1
5,939,975 A * 8/1999 Tsuria et al. ................ 340/426
5,969,433 A * 10/1999 Maggiora et al. .......... 307/10.5

* cited by examiner

*Primary Examiner*—Daniel J. Wu
*Assistant Examiner*—Tai T. Nguyen
(74) *Attorney, Agent, or Firm*—Jack Lo

(57) ABSTRACT

The present automated vehicle regulation compliance enforcing system is comprised of an on-board monitoring system for being installed on a heavy truck, and an interrogation system for being installed in enforcement vehicles and inspection stations. The monitoring system is comprised of a processor connected to speed and weigh sensors installed in the truck and trailers. The processor is arranged to monitor various operating parameters of the truck, such as loading, load distribution, speed, driver maintenance information, driving time, and mileage. The processor is also connected to an interface which enables the truck operator to input driver and vehicle information, and a transceiver for communicating with the interrogation system. The interrogation system is comprised of a processor connected to a transceiver, and arranged to interrogate the monitoring system to download data. The interrogation system may be mounted in an enforcement vehicle as a standalone system with a built-in interface attached to the processor, or it may be a PC-based system with a communication port for connecting to a personal computer. In either embodiment, the processor in the interrogation system is arranged to automatically alert enforcement personnel when any the operating parameters of a monitored truck is outside a preset limit.

21 Claims, 4 Drawing Sheets

AUTOMATED VEHICLE REGULATION COMPLIANCE ENFORCING SYSTEM

CROSS REFERENCE TO RELATED APPLICATIONS

We claim the benefit of provisional application No. 60/157,638, filed Oct. 4, 1999.

BACKGROUND OF THE INVENTION

1. Field of the Invention

This invention relates generally to systems for reporting the compliance of heavy trucks with vehicle regulations.

2. Prior Art

Commercial cargo truck operators are generally paid according to the weight of the cargo carried in their trucks. Therefore, they tend to carry as much in the trucks as possible to maximize profits. However, trucks are required by government regulations to be operated within specific weight or load limits for safety. An overloaded truck is dangerous to itself and other vehicles on the road because its safe operation and general controllability are greatly reduced. Despite the regulations, the pressure of profits cause many truck operators to overload their trucks at the expense of safety. Over 5,300 deaths and 100's of thousands of injuries each year are attributed to overloaded trucks.

The only prior art method for monitoring loading compliance of trucks is to require them to stop at weigh stations along major highways to check their weight. The problem is that there are over 8 million commercial trucks being operated by over 500,000 trucking companies in the United States, but there are less than 26,000 weigh stations in limited operation. Further, the operation of the weigh stations is limited to spurious hours and days. Many overloaded trucks drive past the stations during off hours, or circumvent them by taking alternate routes. The current loading enforcement method is thus inadequate for improving trucking safety.

OBJECTIVES OF THE INVENTION

Accordingly, the objectives of the present vehicle regulation compliance enforcing system are:

- to provide an on-board monitoring system for mounting on each truck and continuously monitoring various operating parameters of the vehicle;
- to provide an interrogation system for enforcement agencies to remotely monitor the operating parameters of each vehicle;
- to enable enforcement agencies to download vehicle and driver information from each vehicle;
- to automatically alert the vehicle driver and enforcement agencies of violations when a vehicle is operated outside safety limits;
- to easily identify vehicles which are not being operated safely, even when the vehicle is in transit, and without diverting them to weigh stations;
- to increase trucking safety by deterring vehicle owners and operators from operating their vehicles outside safety limits; and
- to increase trucking safety without adding to the existing infrastructure and without interrupting the flow of traffic.

Further objectives of the present invention will become apparent from a consideration of the drawings and ensuing description.

BRIEF SUMMARY OF THE INVENTION

The present automated vehicle regulation compliance enforcing system is comprised of an on-board monitoring system for being installed on a heavy truck, and an interrogation system for being installed in enforcement vehicles and inspection stations. The monitoring system is comprised of a processor connected to speed and weigh sensors installed in the truck and trailers. The processor is arranged to monitor various operating parameters of the truck, such as loading, load distribution, speed, driving time, and mileage. The processor is also connected to an interface which enables the operator to input driver and vehicle information, and a transceiver for communicating with the interrogation systems. The interrogation systems are each comprised of a processor connected to a transceiver, and arranged to interrogate the monitoring system to download data. The interrogation system may be a standalone system with a built-in interface attached to the processor, or it may be a PC-based system with a communication port for connecting to a personal computer. In either embodiment, the processor in the interrogation system is arranged to automatically alert enforcement personnel when any of the operating parameters of a monitored vehicle is outside a preset limit.

DETAILED DESCRIPTION OF THE INVENTION

Figure 1:
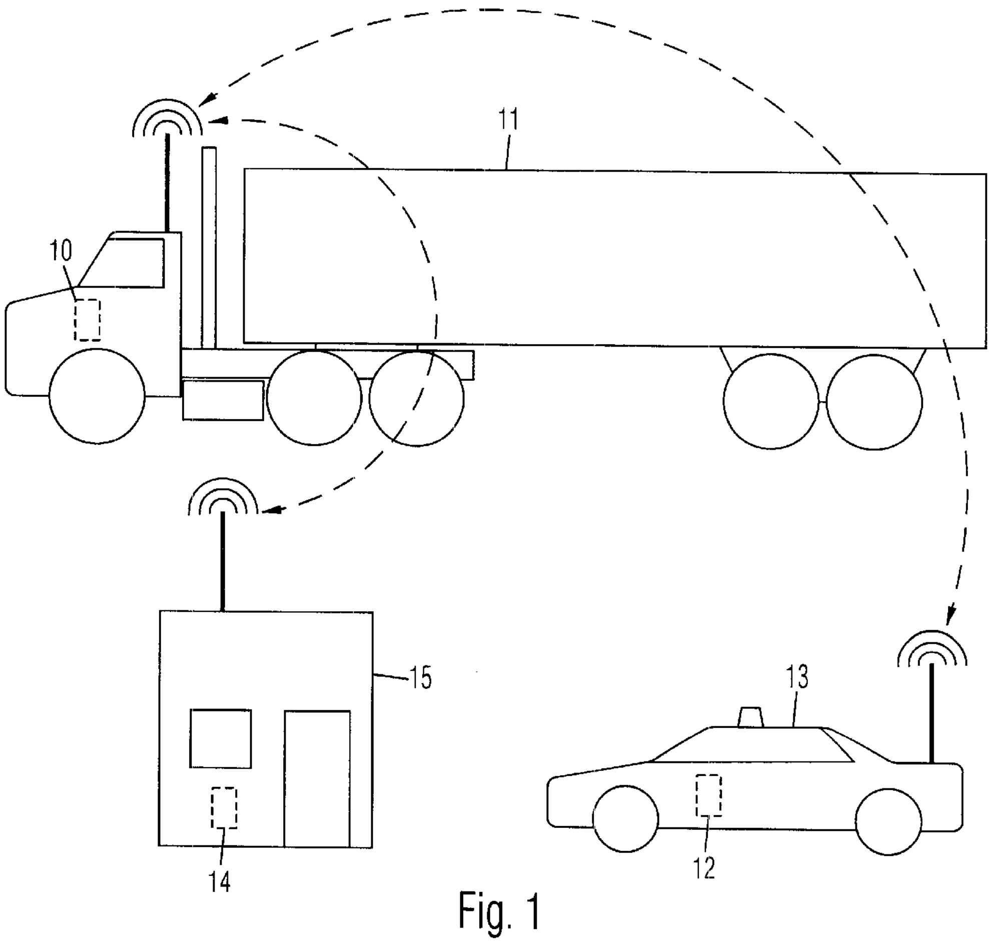
FIG. 1 is a side view of the present automated vehicle regulation compliance enforcing system installed in a cargo truck, an enforcement vehicle, and an inspection station.

FIG. 1:

A preferred embodiment of the present automated vehicle regulation compliance enforcing system is shown in a side view in FIG. 1. It is comprised of an on-board vehicle monitoring system 10 adapted to be installed in a monitored vehicle 11, such as a cargo truck, a tractor-trailer, municipal vehicle, parcel carrier, etc. The monitoring system may be installed in any other type of vehicle that requires monitoring. It is also comprised of a standalone interrogation system 12 adapted to be installed in an enforcement vehicle 13, such as a police car, highway patrol car, municipal vehicle, etc. It is further comprised of a PC-based interrogation system 14 adapted to be installed in an inspection or weigh station 15. Interrogation systems 12 and 14 are arranged to remotely communicate with vehicle monitoring system 10 through a communication link, such as a radio frequency link.

Figure 2:
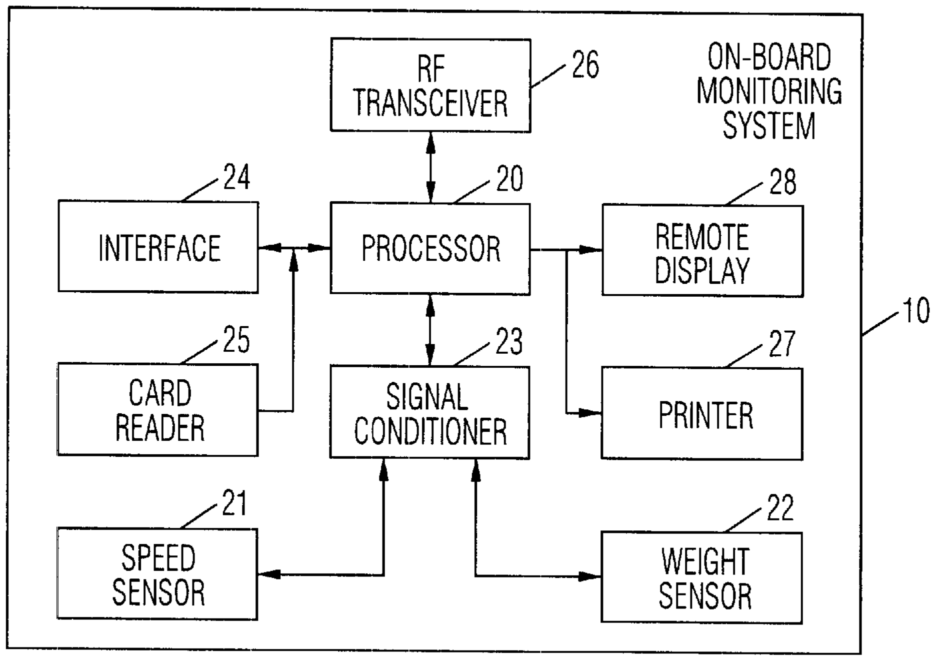
FIG. 2 is a block diagram of an on-board monitoring system thereof for mounting in the truck.

FIG. 2:

As shown in FIG. 2, vehicle monitoring system 10 is comprised of a processor 20 connected to a speed sensor 21 and a plurality of weight sensors 22, preferably through a signal conditioner 23. Processor 20 is arranged to monitor various vehicle operating parameters, such as loading or weight, speed, start/stop times and dates, travel time, mileage, etc. Processor 20 also incorporates a timer (not shown) for keeping time, and to volatile and non-volatile memory or mass storage (not shown) for retention of data on operating parameters. Speed sensor 21 is preferably attached to a suitable part of the monitored vehicle, such as the drive shaft or speedometer, for monitoring its speed. Weight sensors 22 are preferably distributed around the monitored vehicle, such as on the front and rear wheel axles or suspensions, trailer axles, for monitoring its loading and load distribution. Speed sensor 21 may be any suitable type of sensor, such as an optical encoder, hall effect sensor, etc. Weight sensors 22 may be any suitable type of sensor, such as load cells, pressure transducers, etc.

An interface 24 attached to processor 20 enables a truck operator to input driver information and vehicle information, and for controlling various functions of the system. Vehicle information may include manufacturer, model number, class or type, vehicle identification number, number of wheel axles, vehicle license number, inspection dates, insurance information, compliance status, etc. Interface 24 is preferably comprised of an input device and a display, and is mounted in the cabin or cab of the monitored vehicle. A card reader 25 is connected to processor 20 for reading a driver's license to identify the driver, and is preferably located adjacent interface 24. A radio frequency or RF transceiver 26 is connected to processor 20 for remotely communicating with the interrogation systems. A printer 27 is connected to processor 20 for printing out a selected portion of the stored data, such as the monitored operating parameters, driver information, and vehicle information. A remotely mounted display 28 is connected to processor 20 and may be attached to the exterior of the monitored vehicle for displaying monitored parameters, such as loading and speed, for all to see.

Figure 3:
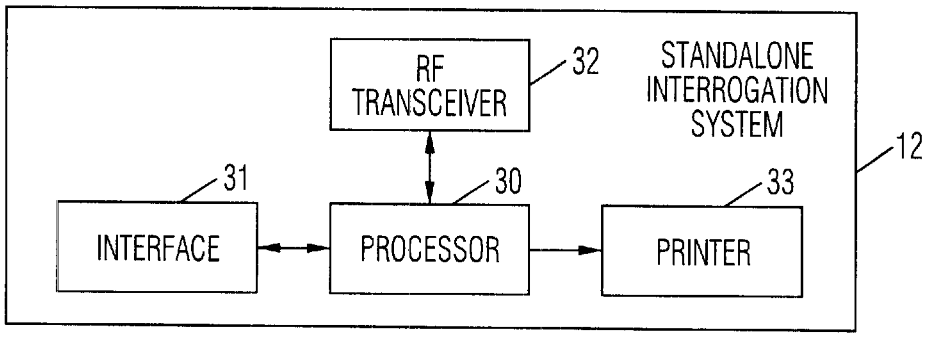
FIG. 3 is a block diagram of a standalone interrogation system thereof.

FIG. 3:

As shown in FIG. 3, standalone interrogation system 12 is comprised of a processor 30 connected to an interface 31 for being controlled by enforcement agency personnel, such as police officers. Standalone interrogation system 12 is preferably mounted in an enforcement vehicle, such as a police or highway patrol car, but it may be hand-portable if made small enough. Interface 31 is preferably comprised of an input device and a display. Processor 30 is connected to a RF transceiver 32 for remotely interrogating the on-board monitoring system of the monitored vehicle and downloading stored data therefrom, such as vehicle operating parameters, driver information, vehicle information, etc. Interrogation can be done when either the monitored vehicle or the enforcement vehicle is at rest or in transit, and without diverting the monitored vehicle into a weigh station. The collected data may be saved to a built-in storage device, such as non-volatile memory or hard disk. A printer 33 is also connected to processor 30 for printing out the data.

Figure 4:
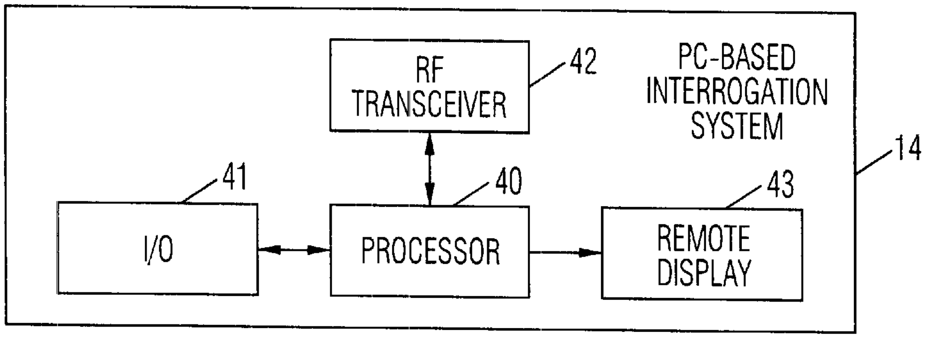
FIG. 4 is a block diagram of a PC-based interrogation system thereof.

FIG. 4:

As shown in FIG. 4, PC-based interrogation system 14 is comprised of a processor 40 connected to input/output or I/O ports 41 for connecting to a host or personal computer, such as at an inspection or weigh station which is operated by enforcement agency personnel. The interface is thus provided by the host computer. Alternatively, the interface may be provided by a remotely located computer linked to interrogation system 14 through a RF transceiver 42 connected to processor 40. Various peripherals, such as traffic lamps for directing the flow of vehicles into and out of the inspection station, may be connected to I/O ports 41. Processor 40 is connected to transceiver 42 for interrogating the on-board monitoring system of the monitored vehicle and downloading data therefrom. A remote display 43 may be connected to processor 40 for displaying the data outside the inspection station for the truck drivers to see.

Alternatively, processor 40 may be comprised of a conventional personal computer. Transceiver 42 and remote display 43 may be connected to proprietary expansion cards installed inside the personal computer, or they may be connected to conventional I/O ports on the computer.

Interrogation can be done whether the monitored vehicle is at rest or in transit, and without diverting the monitored vehicle into the inspection station. Interrogation can even be done automatically when the interrogation system is unattended. The collected data may be saved to a storage device in the host computer for later study, which is especially useful when the system is unattended.

Figure 5:
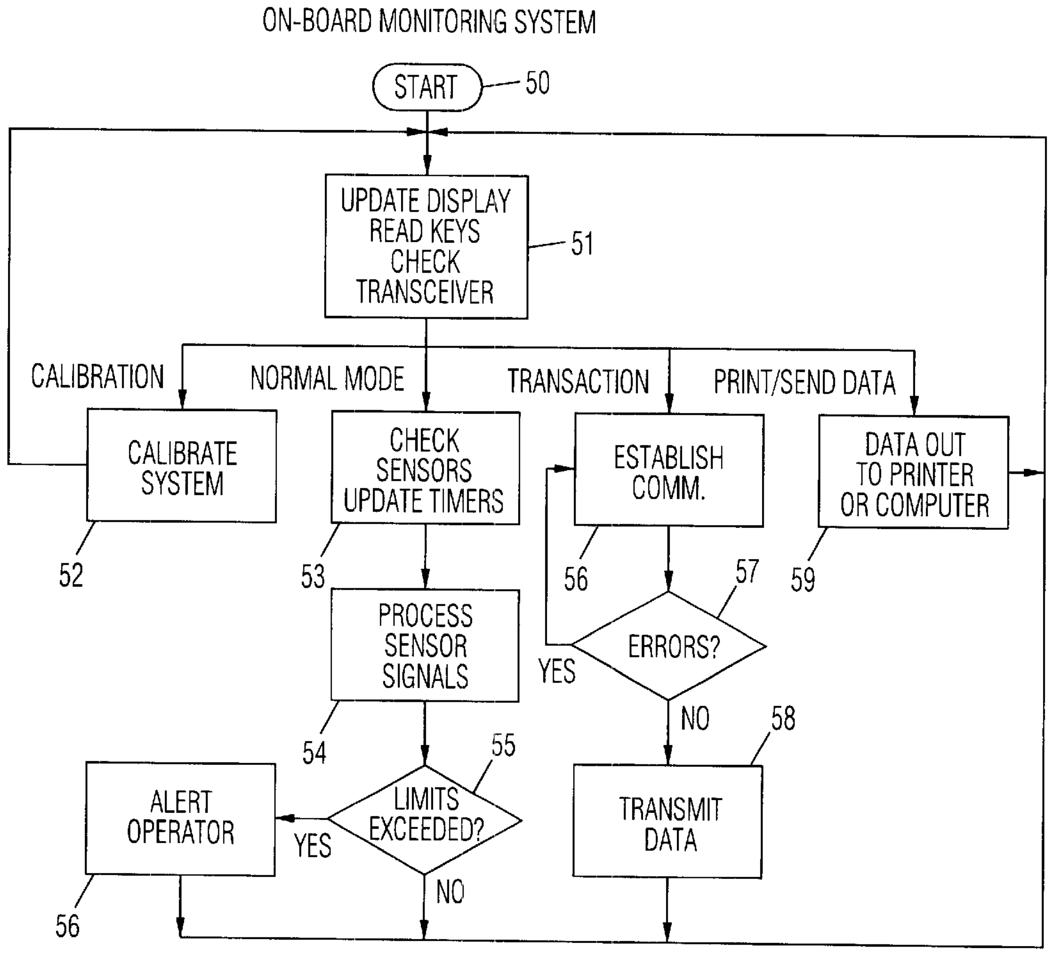
FIG. 5 is a flowchart of the software in the on-board monitoring system.

FIG. 5:

The operation of the on-board vehicle monitoring system is shown in FIG. 5. The processor of the system is programmed to perform the steps shown. After the system is started at block 50, the display of the interface is updated, the keys in the interface are read for any input, and the transceiver is checked for interrogation signals from the interrogation systems at block 51.

The monitoring system may be calibrated at block 52 through the interface when the vehicle is at rest for accurately reading the speed sensor and weight sensors. For example, the system may be calibrated to read the cargo weight only, and is zeroed when the vehicle is empty of cargo. The system may be calibrated to read the total weight of the vehicle, which may be done by manually entering a known weight, such as the weight measured at a conventional weight station. The system may also be arranged to provide GROSS, TARE, and NET weights upon request. Loading and weight are interchangeable terms since the enforcement agency might be interested in either the weight of the cargo load or the total weight of the vehicle. The load distribution may be determined by measuring the difference in weight between the front and rear of the monitored vehicle as well as the trailer axles.

The monitoring system is in normal mode when it is not in any other mode. All the sensors are checked and the timers are updated at block 53 for keeping track of driving time and mileage. The signals from the sensors are processed at block 54 for checking all the operating parameters of the vehicle, such as loading, load distribution, speed, mileage, etc. If the operating parameters are within predetermined limits at block 55, the process is returned to block 51 to continue monitoring. If any limit is exceeded at block 55, such as overloading, unsafe weight distribution, speeding, driving too long, etc., an alert is indicated to the driver at block 56, such as through the interface or a separate audible and/or visual alarm.

When an interrogation signal is received by the monitoring system at block 51, it is put into transaction mode, and communication with the interrogation system is established at block 56. If any communication error is encountered at block 57, the process is returned to block 56 until communication is properly established. Data, including monitored parameters and other stored information, are transmitted to the interrogation system at block 58.

A hard copy of selected or all stored data may be printed at block 59 by selecting print/send data. Printing can be initiated through the interface, at programmed times, or under predetermined system conditions.

Figure 6:
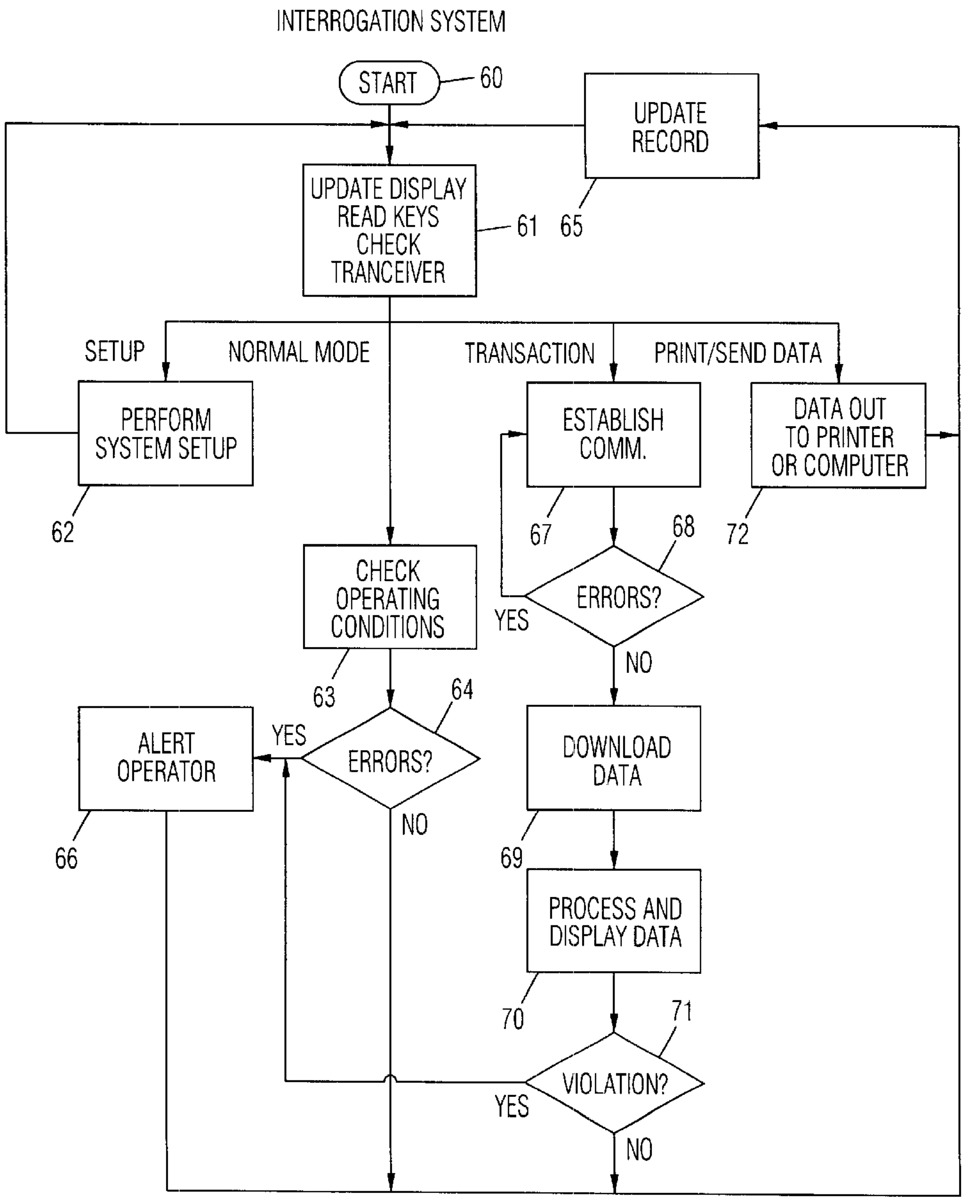
FIG. 6 is a flowchart of the software in each interrogation system.

FIG. 6:

The operation of each interrogation system is shown in FIG. 6. The processor of the system is programmed to perform the steps shown. In the standalone interrogation system, the control software is loaded in non-volatile memory or mass storage. In the PC-based interrogation system, the control software is preferably loaded into the host computer, but it may be stored in non-volatile memory directly connected to the processor of the system.

The interrogation system is started at block 60. At block 61, the display in the interface is updated, the input devices are checked for input, and the transceiver is checked for proper operation.

The interrogation system may be setup at block 62 through the interface, such as setting the permissible limits of the monitored parameters.

Normal mode is in effect when the system is not in any other mode. The operating conditions are checked at block 63, that is, a self-diagnostic is performed. If no errors are detected at block 64, the system record in the interrogation system is updated with the results of the self-diagnostic at block 65, and the process is returned to block 61. If any error is detected, an alerted is produced at block 66 through the interface, or an additional audible and/or visual indicator.

An interrogation or transaction can be initiated with the interface by the enforcement agency personnel when in proximity of a monitored vehicle. Alternatively, the monitoring system may be arranged to continuously broadcast an interrogation signal, and the transaction may be automatically initiated by the interrogation system whenever it is answered by a monitored vehicle which is within communication range. Whenever the transaction is initiated, communication with the monitored vehicle is established at block 67. If any communication error is detected at block 68, the process is returned to block 67. If no error is detected at block 68, data from the monitored vehicle is received at block 69. The received data is processed and displayed at block 70. The data is compared to the permissible limits previously set at block 62. If none of the monitored parameters is outside its permissible limit at block 71, the system record in the interrogation system is updated with the newly received data at block 65, that is, the new data is saved. If any of the monitored parameters is outside its permissible limit at block 71, an alert is produced at block 66, and the system record in the interrogation system is updated with the newly received data at block 65. Alternatively, newly received data may be selectively saved by the operator. Whenever a violation is indicated, the enforcement agency personnel can take appropriate action, such as directing the monitored vehicle into an inspection station for further inspections, stopping the monitored vehicle until the violation is corrected, issuing a citation, print a hard copy of data, etc.

SUMMARY AND SCOPE

Accordingly, the present vehicle regulation compliance enforcing system provides an on-board monitoring system for mounting on each vehicle and continuously monitoring various operating parameters of the vehicle. It provides an interrogation system for enforcement agencies to remotely monitor the operating parameters of each. It enables enforcement agencies to download vehicle and driver information from each truck. It automatically alerts the vehicle operator and enforcement agencies of violations when a vehicle is operated outside safety limits. It easily identifies trucks which are not being operated safely, even when the vehicle is in transit, and without diverting them to weigh stations. It increases trucking safety by deterring truck drivers from operating their vehicles outside safety limits, while greatly increasing the number of vehicles that are checked for compliance.

Although the above description is specific, it should not be considered as a limitation on the scope of the invention, but only as an example of the preferred embodiment. Many variations are possible within the teachings of the invention. Therefore, the scope of the invention should be determined by the appended claims and their legal equivalents, not by the examples given.

We claim:

1. An automated vehicle regulation compliance enforcing system, comprising:

an on-board vehicle monitoring system adapted to be installed in a monitored vehicle, wherein said on-board monitoring system is comprised of:

a first processor;

a first interface connected to said first processor;

a sensor connected to said first processor and adapted to be attached to said monitored vehicle for monitoring an operating parameter of said monitored vehicle, wherein said sensor is comprised of a speed sensor, said operating parameter is comprised of vehicle speed, said first processor is arranged to produce an alert when said operating parameter exceeds a predetermined limit; and a first transceiver connected to said first processor for transmitting data on said operating parameter; wherein said first processor is arranged to receive driver and vehicle information through said first interface and transmit said driver and vehicle information with said transceiver; and an interrogation system for use by an enforcement agency, wherein said interrogation system is comprised of:

a second processor;

a second interface connected to said second processor for enabling a user to operate said interrogation system; and a second transceiver connected to said second processor for remotely receiving said data from said monitoring system to enable said enforcement agency to monitor said operating parameter of said monitored vehicle; wherein said second processor of said interrogation system is arranged to produce an alert when said vehicle speed exceeds a predetermined limit.

2. The automated vehicle regulation compliance enforcing system of claim 1, wherein said interrogation system is comprised of a standalone interrogation system adapted to be operated without an externally attached personal computer, so that said standalone interrogation system is usable in an enforcement vehicle.

3. The automated vehicle regulation compliance enforcing system of claim 1, wherein said interrogation system is comprised of a PC-based interrogation system wherein said second processor is comprised of a PC processor, and said interface is comprised of an input device and a display.

4. The automated vehicle regulation compliance enforcing system of claim 1, wherein said sensor is comprised of a weight sensor, said operating parameter is comprised of loading of said monitored vehicle, and second processor of said interrogation system is arranged to produce an alert when said loading exceeds a predetermined limit.

5. The automated vehicle regulation compliance enforcing system of claim 1, wherein said first processor is arranged to calibrate said vehicle monitoring system when said monitored vehicle is at rest for accurately reading said sensor.

6. The automated vehicle regulation compliance enforcing system of claim 1, further including a card reader connected to said first processor, wherein said first processor is adapted to read a driver's license through said card reader for driver information, and said first processor is arranged to transmit said driver information with said transceiver.

7. The automated vehicle regulation compliance enforcing system of claim 1, further including a remote display connected to said first processor and adapted to be attached to an exterior of said monitored vehicle, wherein said first processor is arranged to display on said remote display a selected portion of said data for public viewing.

8. The automated vehicle regulation compliance enforcing system of claim 1, further including a printer connected to said first processor for printing out a selected portion said data.

9. An automated vehicle regulation compliance enforcing system, comprising:

an on-board vehicle monitoring system adapted to be installed in a monitored vehicle, wherein said on-board monitoring system is comprised of:

a first processor for monitoring one or more operating parameters of said monitored vehicle, wherein said operating parameters are at least comprised of loading of said monitored vehicle;

a weight sensor connected to said first processor and adapted to be attached to said monitored vehicle for sensing said loading;

a first transceiver connected to said first processor for transmitting data on said operating parameters;

a speed sensor connected to said first processor and adapted to be attached to said monitored vehicle for sensing vehicle speed, wherein said operating parameters include said vehicle speed; and a first interface connected to said first processor, wherein said first processor is arranged to receive driver and vehicle information through said first interface, and said first processor is arranged to transmit said driver and vehicle information with said transceiver;

wherein said first processor is arranged to produce an alert when any selected operating parameter, but at least including said loading, of said monitored vehicle exceeds a predetermined limit;

an interrogation system for use by an enforcement agency, wherein said interrogation system is comprised of:

a second processor;

an interface connected to said second processor for enabling a user to operator said interrogation system; and a second transceiver connected to said second processor for remotely receiving said data from said monitoring system to enable said enforcement agency to monitor said operating parameters of said monitored vehicle; wherein said second processor of said interrogation system is arranged to produce an alert when said vehicle speed exceeds a predetermined limit.

10. The automated vehicle regulation compliance enforcing system of claim 9, wherein said interrogation system is comprised of a standalone interrogation system adapted to be operated without an externally attached personal computer, so that said standalone interrogation system is usable in an enforcement vehicle.

11. The automated vehicle regulation compliance enforcing system of claim 9, wherein said interrogation system is comprised of a PC-based interrogation system wherein said second processor is comprised of a PC processor, and said interface is comprised of an input device and a display.

12. The automated vehicle regulation compliance enforcing system of claim 9, further including additional weight sensors connected to said first processor and adapted to be attached to said monitored vehicle, wherein said first processor is arranged to monitor weight distribution of said vehicle.

13. The automated vehicle regulation compliance enforcing system of claim 9, further including a card reader connected to said first processor, wherein said first processor is adapted to read a driver's license through said card reader for driver information, and said first processor is arranged to transmit said driver information with said transceiver.

14. The automated vehicle regulation compliance enforcing system of claim 9, further including a remote display connected to said first processor and adapted to be attached to an exterior of said monitored vehicle, wherein said first processor is arranged to display on said remote display a selected portion of said data for public viewing.

15. The automated vehicle regulation compliance enforcing system of claim 9, further including a printer connected to said first processor for printing out a selected portion said data.

16. An automated vehicle regulation compliance enforcing system, comprising:

an on-board vehicle monitoring system adapted to be installed in a monitored vehicle, wherein said on-board monitoring system is comprised of:

a first processor for monitoring one or more operating parameters of said monitored vehicle, wherein said operating parameters are at least comprised of loading of said monitored vehicle;

a first interface connected to said first processor for entering driver information and vehicle information;

a speed sensor connected to said first processor and adapted to be attached to said monitored vehicle for sensing vehicle speed, wherein said operating parameters include said vehicle speed;

a weight sensor connected to said first processor and adapted to be attached to said monitored vehicle for sensing said loading;

a card reader connected to said first processor, wherein said first processor is adapted to read a driver's license through said card reader for said driver information; and a first transceiver connected to said first processor for transmitting data on said operating parameters, said driver information, and said vehicle information;

wherein said first processor is arranged to produce an alert when any selected operating parameter, but at least including said loading, of said monitored vehicle exceeds a predetermined limit;

an interrogation system for use by an enforcement agency, wherein said interrogation system is comprised of:

a second processor;

an interface connected to said second processor for enabling a user to operator said interrogation system; and a second transceiver connected to said second processor for remotely receiving said data from said monitoring system to enable said enforcement agency to monitor said operating parameters of said monitored vehicle, and identify said monitored vehicle and a driver thereof by said vehicle information and said driver information;

wherein said second processor is arranged to produce an alert when any single selected operating parameter, but at least including said loading and said vehicle speed, of said monitored vehicle exceeds a predetermined limit, said enforcement agency is thus able to enforce loading regulations and reduce crashes caused by overloaded vehicles.

17. The automated vehicle regulation compliance enforcing system of claim 16, wherein said interrogation system is comprised of a standalone interrogation system adapted to be operated without an externally attached personal computer, so that said standalone interrogation system is usable in an enforcement vehicle.

18. The automated vehicle regulation compliance enforcing system of claim 16, wherein said interrogation system is comprised of a PC-based interrogation system wherein said second processor is comprised of a PC processor, and said interface is comprised of an input device and a display.

19. The automated vehicle regulation compliance enforcing system of claim 16, further including additional weight sensors connected to said first processor and adapted to be attached to said monitored vehicle, wherein said first processor is arranged to monitor weight distribution of said vehicle.

20. The automated vehicle regulation compliance enforcing system of claim 16, further including a remote display connected to said first processor and adapted to be attached to an exterior of said monitored vehicle, wherein said first processor is arranged to display on said remote display a selected portion of said data for public viewing.

21. The automated vehicle regulation compliance enforcing system of claim 16, further including a printer connected to said first processor for printing out a selected portion said data.

* * * * *